E. H. DIECKMANN.
TRACTOR.
APPLICATION FILED JULY 19, 1918.

1,324,309.

Patented Dec. 9, 1919.
3 SHEETS—SHEET 1.

Inventor:
EDWARD H. DIECKMANN,
By John N. Bruninga
His Attorney.

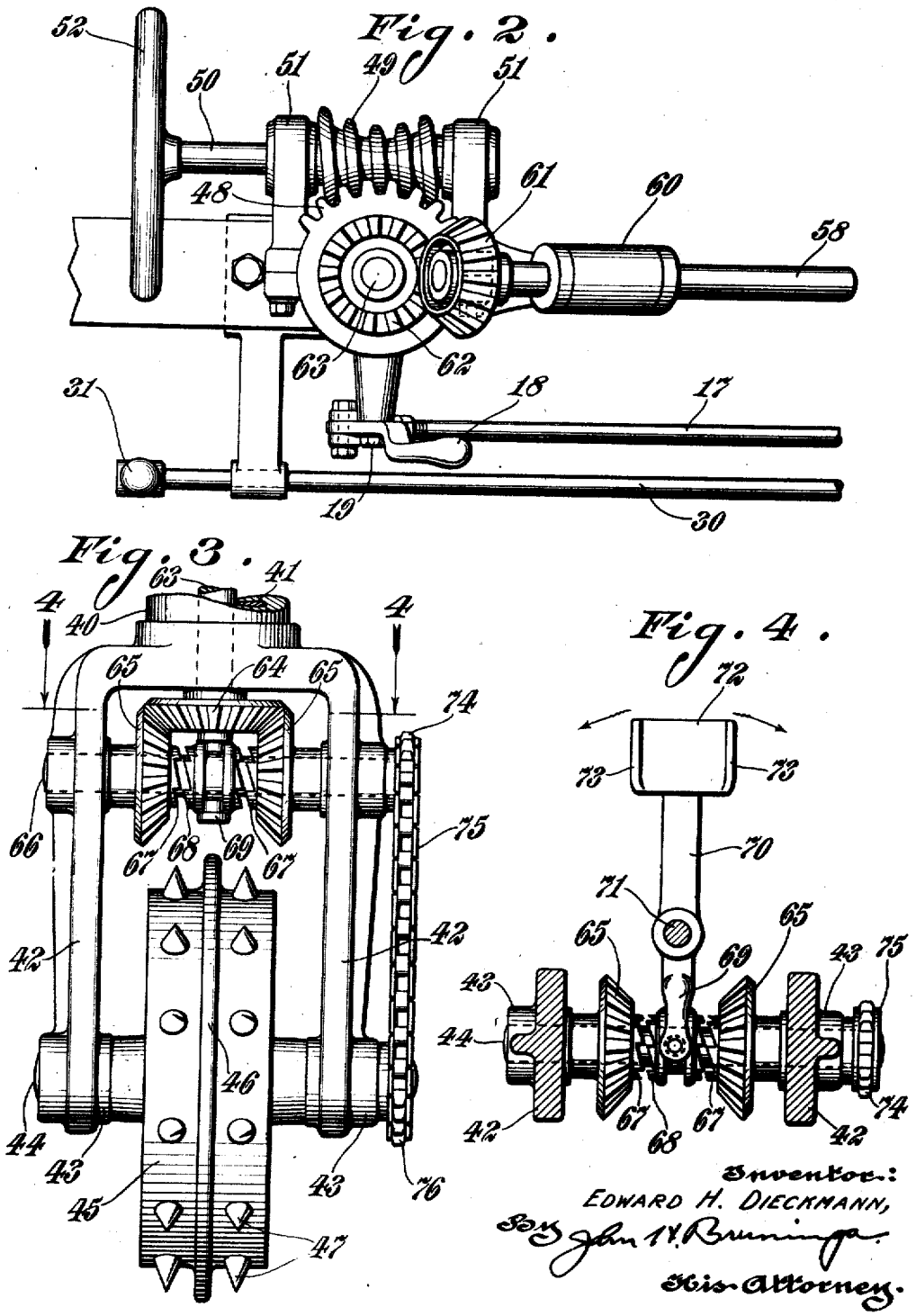

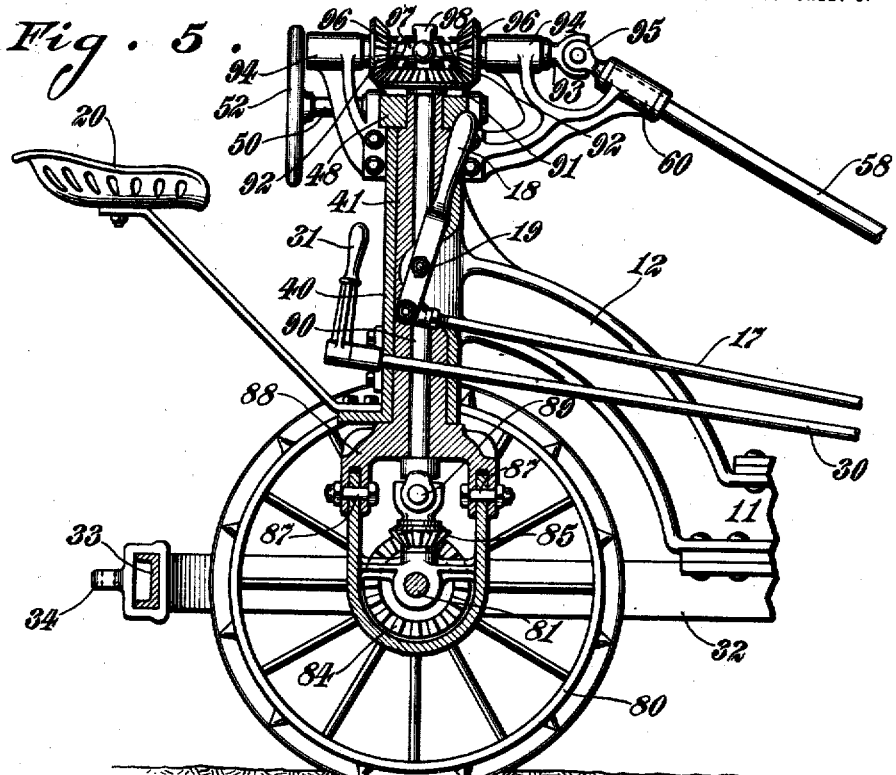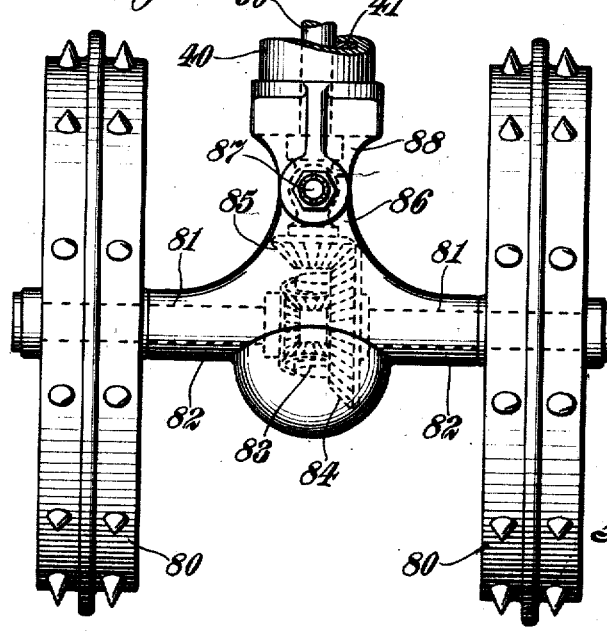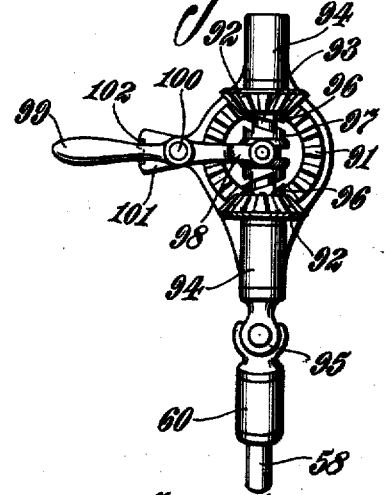

UNITED STATES PATENT OFFICE.

EDWARD H. DIECKMANN, OF FLORRISANT, MISSOURI.

TRACTOR.

1,324,309.　　　　Specification of Letters Patent.　　　Patented Dec. 9, 1919.

Application filed July 19, 1918. Serial No. 245,659.

*To all whom it may concern:*

Be it known that I, EDWARD H. DIECKMANN, a citizen of the United States, and residing at Florrisant, county of St. Louis, State of Missouri, have invented a certain new and useful Improvement in Tractors, of which the following is a specification.

This invention relates to tractors.

In tractors as now constructed, the steering is accomplished through one or more steering wheels mounted on the tractor frame, either in front of or behind the traction wheels. In view of the fact, however, that the steering wheel or wheels are mounted for free movement, it is difficult to turn sharp corners, especially on soft or plowed ground, and especially if there is a considerable load drawn by the tractor. This is due to the fact that the steering wheel or wheels act as a rudder on a ship, the turning movement being accomplished by the resistance offered by this wheel or wheels. Accordingly, where the steering wheel or wheels are given sharp turn, they are liable to drag axially instead of swinging the tractor frame, this action being especially noticeable in soft ground, and where there is a considerable drag by a heavy load on the tractor, as this heavy load tends to keep the tractor moving in a straight line.

One of the objects of this invention, therefore, is to provide a tractor in which the steering wheel or wheels are driven from the motor of the tractor, but which have such driving connections with the motor, and so controlled, that this steering traction wheel or wheels may be connected at will with the motor, so as to be driven in either direction when making the desired turn.

At the time that the tractor is making a turn, the axis of the steering wheel or wheels is at an angle with respect to the axis of the traction wheel or wheels. Accordingly, where there are inequalities in the soil, which is generally the case, the steering wheel or wheels will not only fail to make proper contact with the ground, but will throw considerable strain on the frame and other parts. Accordingly, the effective traction of these steering wheels cannot be utilized unless special provisions are made.

Another object of this invention, therefore, is to provide a tractor having a steering traction wheel or wheels, so constructed, so mounted on the frame of the tractor, and so connected with the driving motor, as to accommodate itself or themselves to the inequalities of the ground.

Another object is to provide a tractor in which the driving traction wheel or wheels, and the steering traction wheel or wheels are so connected with the driving motor, and in which these connections are so controlled as to permit connection and disconnection of these wheels independently, and so as to permit these wheels to be driven selectively and at will in any desired direction.

Another object is to provide mechanism adapted to be applied to any suitable tractor, whether new or now in use.

Another object is to provide a tractor which is simple in construction and operation, effective in its action, and cheap to manufacture.

Further objects will appear from the detail description taken in connection with the accompanying drawings, in which, Figure 1 is a longitudinal vertical section, partly in elevation of the tractor embodying this invention;

Fig. 2 is a detail plan view of the steering mechanism;

Fig. 3 is a detail rear elevation of the steering traction wheel and its connected mechanism;

Fig. 4 is a detail section on the line 4—4, Fig. 3, showing the controlling mechanism for the steering traction wheel;

Fig. 5 is a detail similar to Fig. 1, but showing another embodiment of this invention;

Fig. 6 is a detail rear elevation of the traction steering wheels, showing their connections to the frame, and showing also the driving connections; and, Fig. 7 is a detail plan view showing the controlling connections.

Figure 1:
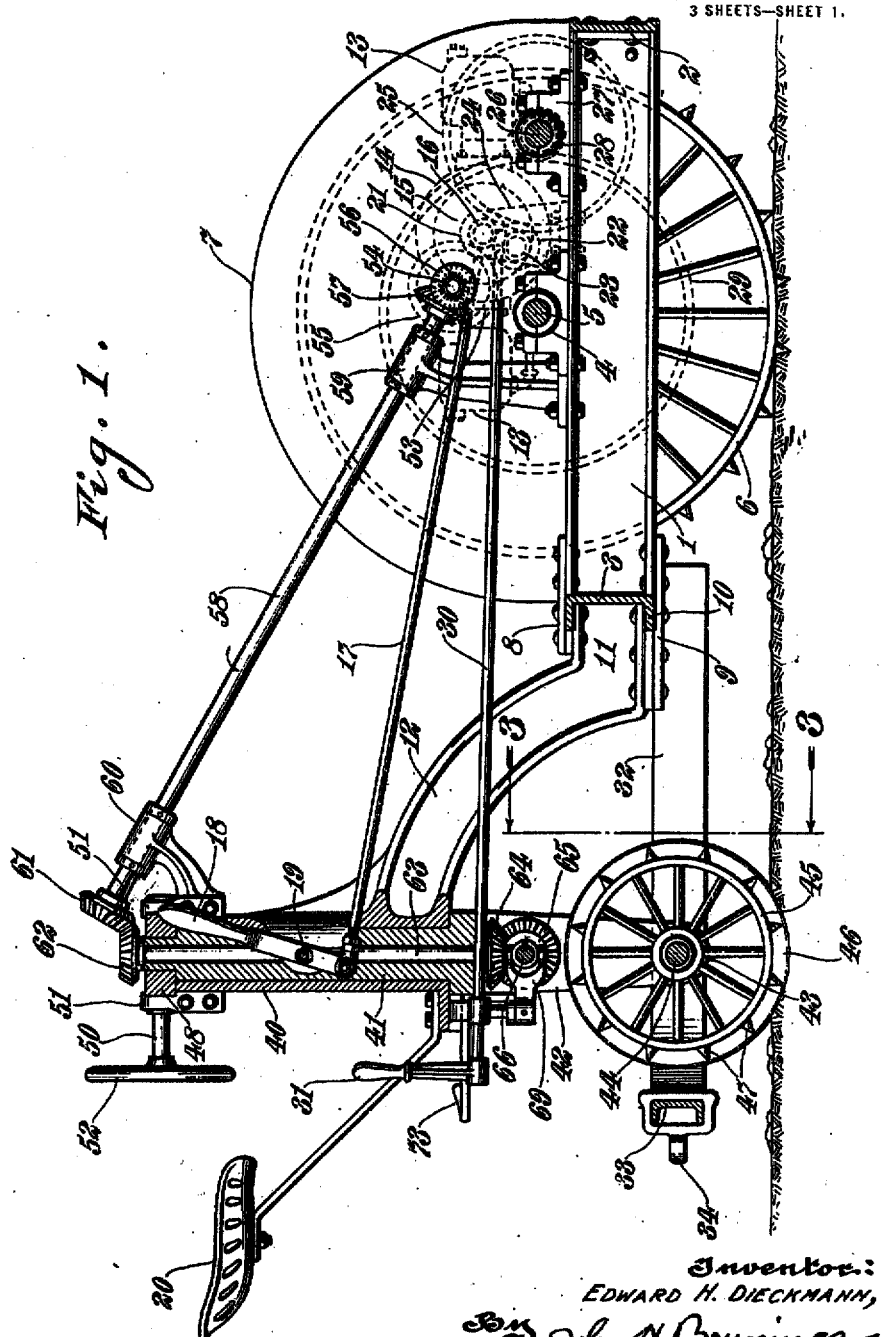

Referring to the accompanying drawing, and first to Figs. 1 to 4 inclusive, the tractor frame comprises a pair of side members 1, connected at their forward ends by a cross-bar 2, and at their rear ends by a cross-bar 3. The side members 1 have mounted thereon, bearings 4, which suspend the frame from the axles 5 of the driving traction wheels 6, these driving traction wheels being provided with suitable guards 7. The cross-member 3 has mounted thereon, plates 8 and 9 respectively, between which and the flanges 10 of the cross-member 3, is riveted the shank 11 of a bracket 12, which curves upwardly and rearwardly and supports the steering wheel, as hereinafter described.

The tractor frame supports a suitable motor 13, which is preferably of the hydrocarbon type, and the crank-shaft of this motor carries a suitable fly-wheel 14 which is connected by a suitable clutch 15 with a shaft 16. This clutch is adapted to connect and disconnect the shaft 16 with and from the motor crank-shaft, the controlling connections being of any suitable and well known construction, and including a link 17 connected with a hand lever 18 pivoted at 19 on the bracket 12. This bracket 12 has also mounted thereon, a driver seat 20, and the hand lever 18 is arranged within reach of the driver, so that the clutch may be operated at will to connect and disconnect the shaft 16 to and from the motor crank-shaft.

The shaft 16 has splined thereto, a sliding gear 21 which also meshes with a sliding gear 22 on a stub-shaft 23, all mounted in a bracket 24 on the tractor frame, and these gears 21 and 22 are adapted to be meshed with a gear 25 on a shaft 26 mounted in bearings 27 on the side members 1. The shaft 26 is in sections extending across the tractor frame, and each section has fixed thereto, a pinion 28 adapted to mesh with a gear 29 on the driving traction wheel 6. It will, of course, be understood that the gear 25 is connected to the sections 26 through suitable differential mechanism. In order to control the meshing of the pinions 21 and 22 with the gear 25, so as to selectively drive the driving traction wheels in either direction, suitable shifting mechanism is provided, this shifting mechanism being controlled by a rotatable rod 30 mounted in the bracket 12, connected at its forward end to shift the pinions 21 and 22, and provided at its rear end with an arm 31, which is within reach of the driver sitting on the seat 20. These driving connections just described, as well as the controlling mechanism therefor, may be of any suitable construction, and are well known to those skilled in the art, their construction and function being such that upon movement of the arm 31 in one direction, the pinions 21 and 22 are shifted to connect the shaft 16 with the gear 25, so as to drive the driving traction wheels in one direction; while when the arm 31 is shifted in the opposite direction, the pinions 21 and 22 are so shifted as to connect the shaft 16 with the gear 25, so as to drive the driving traction wheel 6 in the reverse direction. It will, of course, be understood that the clutch is disengaged during the gear-shifting movement. This mechanism is so well known in the art that further description thereof will be unnecessary.

The side members 1 have attached thereto, a tractor connection comprising a pair of side members 32 extending rearwardly and connected at their rear end by a rounded yoke 33, which is encircled by a clevis 34, adapted to be attached to a plow or any suitable mechanism which is to be drawn by the tractor.

The bracket 12 has formed thereon, a tubular bearing 40 which receives a hollow shank 41 carrying at its lower end, forks 42 provided with bearings 43 for the shaft 44 of a steering traction wheel 45. This steering traction wheel is comparatively narrow, and is provided with a rib 46, and with spurs 47, so as to obtain a firm grip on the soil; at the same time, it is adapted to accommodate itself to the inequalities of the ground. The tubular shank 41 has fixed to its upper end, a worm segment 48 meshing with a worm 49 on a shaft 50, mounted in bearings on a bracket 51, clamped or secured to the tubular bearing 40. The shaft 50 is provided with a hand wheel 52, accessible to the driver sitting on the seat 20, so that the driver may control the movement of the shank 41, the forks 42, and the steering traction wheel 45.

Mounted in a bracket 53 on the bracket 4 is a shaft 54, which has fixed thereto a gear 55, in continual mesh with the pinion 21 on the shaft 16, and this shaft 54 has also fixed thereto, a bevel gear 56 meshing with a bevel gear 57 on a shaft 58, supported in bearings 59 and 60 on the tractor frame and the bracket 51 respectively. The shaft 58 extends rearwardly, as shown in Fig. 1, and has fixed thereto a bevel gear 61 meshing with a bevel gear 62 on a shaft 63 extending through the shank 41. This shaft 63 has fixed thereto a bevel gear 64 meshing with a pair of bevel gears 65 loosely mounted on a shaft 66 in the fork 42. The bevel gears 65 are provided with jaw-clutch teeth 67, adapted to be engaged by the jaws on a clutch-sleeve 68, splined on the shaft 66, and engaged by a fork 69 on a lever 70, pivoted at 71 on the bracket 12, and provided at its rear end with a pedal or heel engaging member 72 having upper extending flanges 73, whereby the arm 70 may be shifted by the heel of the driver sitting on the seat 20, so as to selectively connect either of the bevel gears 65 with the shaft 66. The shaft 66 has fixed thereto a sprocket 74 which is connected by a chain 75 with a sprocket 76 on the shaft 44.

When the tractor is driven forwardly or rearwardly in a straight line, the arm 70 is shifted to neutral position, as shown in Fig. 3, so as to leave the steering traction wheel 45 free to turn freely with its shaft 44. The control of the tractor in driving forwardly or reversely is, therefore, governed by the clutch and gear connections controlled by the arms 18 and 31. At this time the position of the steering traction wheel 45 can, of course, be controlled by the hand wheel 52. When a sharp turn is to be made, the driving traction wheels 6 are disconnected from the motor by manipulation of the clutch, and by shifting the gearing through the arm 31 to neutral. When the clutch is disengaged, the driver will now shift the arm 70 to shift the clutch sleeve 68, so as to connect the desired bevel gear 65 to the shaft 66, depending upon the direction which it is desired the steering traction wheel shall turn. The steering traction wheel can now be adjusted even transversely of the longitudinal line of the tractor frame by manipulation of the hand wheel 52, and by then engaging the clutch through the operation of the arm or clutch lever 18, power is applied to the steering traction wheel 45, thereby causing this wheel to swing the entire tractor frame on a point midway the driving traction wheels 6 as an axis, so as to turn the tractor through any suitable angle, even ninety (90°) degrees or greater. In view of the fact that the steering traction wheel is positively driven at this time, it will positively carry the load attached to the clevis 34 with it, so this clevis can slide freely on the rounded crosspiece 33, while the turn is being made. After the tractor has thus been swung to the desired angle, the clutch sleeve 68 can again be shifted to neutral, after first disengaging the clutch 18, and then by again shifting the arm 31 in the desired direction, the tractor can be driven forward after the steering traction wheel 45 has again been straightened out. In making gradual turns, it is desirable to drive both the driving traction wheels 6, and the steering traction wheel 45, and this can be readily accomplished, since the driving gearing connecting the motor with these wheels can be rendered operative concurrently, or either independently and separately at the will of the operator. It will be noted that on account of the fact that the steering traction wheel is narrow, it can readily adapt itself to the inequalities of the ground, at the same time maintaining the driving connections to this wheel. The full traction effect of this wheel is, therefore, maintained, and no twisting strains are thrown on the traction frame. In view of the fact that the bracket 12 is a separate member attached to the frame of the tractor, by the substitution of another bracket, any existing tractor can be readily converted to employ this invention.

Figs. 5, 6 and 7 show another embodiment of this invention in which the traction steering mechanism comprises a pair of wheels. In such a case, of course, special provisions must be made in order to permit these wheels to accommodate themselves to inequalities of the ground. Accordingly, there must be a flexible connection, not only between the steering wheels and the steering mechanism, but also between the driving connections to the motor and the wheel axle.

In accordance with this invention, the steering driving wheels 80 have connected thereto, axle sections 81 arranged in axle tubes 82, and connected by a differential 83 having a bevel gear 84 meshing with a bevel gear 85, which has a bearing in extensions 86 of the axle tubes. The extensions 86 are pivoted at 87 to the forks 88 fixed to the shank 41. The shaft of the bevel gear 85 also has a universal coupling connection 89 with a shaft 90 passing through the tubular shank 41, this tubular shank also having a worm segment engaging a worm on the shaft 50, provided with a hand wheel 52, as in the construction heretofore described. It will be noted, however, that the axes of the coupling 89 are concentric with the axis of the pivotal connection 87 which, as shown, is transverse to the axis of the axle sections 81.

The shaft 90 has fixed thereto a bevel gear 91, which meshes with a pair of bevel gears 92, loose on a shaft 93, mounted in bearings 94 on the bracket 51, and this shaft 93 has a universal coupling connection 95 with the shaft 58. The bevel gears 92 have jaws 96 adapted to be engaged by jaws 97 splined to the shaft 93, and engaged by a fork 98 on an arm 99 pivoted at 100 on an extension 101, attached to the bracket 51, the arm 99 moving over a segment 102 on this bracket. By shifting the arm 99, the clutch-sleeve 97 can be shifted to, at will, connect either of the bevel gears 92 with the shaft 93, so as to selectively cause the motor to drive the steering traction wheels 80 in either direction.

The operation of this mechanism is substantially the same as of the embodiment heretofore described, and a detail description thereof is, therefore, unnecessary. It will, however, be noted that on account of the fact that there are a pair of steering traction wheels provided, it is necessary to provide differential mechanism connecting the driving gearing with these wheels. Moreover, in order to allow these wheels to accommodate themselves to the inequalities of the ground, the flexible connections between the steering shank and these wheels, and between the driving gearing and these wheels, is necessary. The provision of the mechanism as described, permits these wheels to accommodate themselves to the inequalities of the ground, at the same time maintaining the driving connections to these wheels.

It will, therefore, be seen that the invention accomplishes its objects. The construction and operation of the mechanism is such that a tractive force may be applied to the steering traction wheel or wheels, so as to permit sharp turns of the tractor; at the same time, these wheels are adapted to accommodate themselves to the inequalities of the ground so that not only is the greatest tractive effort applied to this wheel or wheels, but no undue strains are thrown on the tractor frame.

It is obvious that various changes may be made in the details of construction, without departing from the spirit of this invention. It is, therefore, to be understood that this invention is not to be limited to the specific construction shown and described.

Having thus described the invention, what is claimed is:

1. In a tractor, the combination with a frame, a motor thereon, and a traction wheel mounted on said frame and connected to be driven by said motor, of tractive steering means including a carrier, a steering wheel mounted on said carrier and adapted to automatically accommodate itself to inequalities of the ground, and driving connections mounted on said carrier and between said steering wheel and said motor, adapted to selectively drive said steering wheel in either direction, independent of said traction wheel.

2. In a tractor, the combination with a frame, of a motor thereon, a driving traction wheel mounted on said frame, tractive steering means including a carrier, a steering traction wheel mounted on said carrier and adapted to automatically accommodate itself to inequalities of the ground, forward and reverse driving connections between said motor and said driving traction wheel, and forward and reverse connections mounted on said carrier and between said motor and said steering traction wheel and independent of said driving traction wheel connections.

3. In a tractor, the combination with a frame, a motor thereon, and a traction wheel mounted on said frame and connected to be driven by said motor, of a bracket on said frame having a bearing, a carrier having a tubular shank fitting said bearing, a steering traction wheel mounted in said carrier, steering means for turning said shank, and connections between said motor and said steering traction wheel, including a drive shaft mounted in said shank and reversing gearing between said shaft and said steering traction wheel.

4. In a tractor, the combination with a frame, a motor thereon, and a traction wheel mounted on said frame and connected to be driven by said motor, of a bracket mounted on said frame and having a bearing, a carrier mounted for movement in said bearing, a steering traction wheel mounted in said carrier, steering means on said bracket for turning said carrier, a drivers' seat mounted on said bracket, driving connections from said motor to said steering traction wheel, and means mounted on said bracket for controlling said connections.

5. In a tractor, the combination with a frame, a motor thereon, and a traction wheel mounted on said frame and connected to be driven by said motor, of a pair of connected steering traction wheels, a support for and connecting said wheels, a carrier for mounting said supporting and said steering traction wheels for steering movement on said frame, adapted to permit said connected wheels to accommodate themselves to the inequalities of the ground, steering connections to said carrier, and driving connections from said motor to said connected wheels.

6. In a tractor, the combination with a frame, a motor thereon, and a traction wheel mounted on said frame and connected to be driven by said motor, of a pair of connected steering traction wheels, a support for and connecting said wheels, a carrier mounted for steering movement on said frame, means for flexibly mounting said support in said carrier, adapted to permit said connected wheels to accommodate themselves to the inequalities of the ground, steering connections to said carrier, and driving connections from said motor to said connected wheels, including driving means supported in said carrier.

7. In a tractor, the combination with a frame, a motor thereon, and a traction wheel mounted on said frame and connected to be driven by said motor, of a pair of connected steering traction wheels, a support for and connecting said wheels, a carrier mounted for steering movement on said frame, means for flexibly mounting said support in said carrier, adapted to permit said connected wheels to accommodate themselves to the inequalities of the ground, steering connections to said carrier, and driving connections from said motor to said connected wheels, including a driving element mounted in said carrier, and a driven element connected with said wheels and flexibly connected to said driving element.

In testimony whereof I affix my signature this 12th day of April, 1918.

EDWARD H. DIECKMANN.